United States Patent
Subramanya Naidu et al.

(10) Patent No.: US 11,270,416 B2
(45) Date of Patent: Mar. 8, 2022

(54) SYSTEM AND METHOD OF USING OPTIMIZED DESCRIPTOR CODING FOR GEOMETRIC CORRECTION TO REDUCE MEMORY TRANSFER BANDWIDTH OVERHEAD

(71) Applicant: NXP USA, Inc., Austin, TX (US)

(72) Inventors: Sharath Subramanya Naidu, Munich (DE); Michael Andreas Staudenmaier, Munich (DE); Ajit Singh, Delhi (IN)

(73) Assignee: NXP USA, Inc., Austin, TX (US)

( * ) Notice: Subject to any disclaimer, the term of this patent is extended or adjusted under 35 U.S.C. 154(b) by 333 days.

(21) Appl. No.: 16/728,470

(22) Filed: Dec. 27, 2019

(65) Prior Publication Data
US 2021/0201454 A1 Jul. 1, 2021

(51) Int. Cl.
*G06T 5/00* (2006.01)
*G06T 1/60* (2006.01)

(52) U.S. Cl.
CPC ............. *G06T 5/006* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 6,806,903 B1 * | 10/2004 | Okisu | H04N 1/4072 348/254 |
| 6,957,308 B1 | 10/2005 | Patel | |
| 7,903,896 B2 * | 3/2011 | Yamada | H04N 9/735 382/254 |
| 9,536,287 B1 | 1/2017 | Eldar | |
| 9,589,333 B2 * | 3/2017 | Maeno | G06T 5/006 |
| 10,002,436 B2 * | 6/2018 | Yamada | H04N 5/2353 |
| 10,019,810 B2 * | 7/2018 | Arnison | G06T 7/571 |
| 10,032,258 B2 * | 7/2018 | Cho | G06T 11/001 |
| 10,037,598 B2 * | 7/2018 | Gur | G06K 9/4604 |
| 10,063,774 B2 * | 8/2018 | Takenaka | G06T 3/60 |
| 10,115,003 B2 * | 10/2018 | Georgescu | G06T 7/11 |
| 10,516,825 B2 * | 12/2019 | Ikeda | H04N 5/23267 |
| 2007/0165960 A1 * | 7/2007 | Yamada | H04N 9/735 382/254 |

(Continued)

FOREIGN PATENT DOCUMENTS

| | | |
|---|---|---|
| CN | 105095896 A | 11/2015 |
| CN | 103702130 B | 2/2017 |

(Continued)

*Primary Examiner* — Anand P Bhatnagar

(57) ABSTRACT

A geometric correction system and method for performing geometric correction of a distorted image in an input frame to provide a corrected image in an output frame including a local memory, geometric correction circuitry, a tile reader, and a descriptor memory storing multiple tile descriptors. The tile reader retrieves distorted tile data from the input frame into the local memory for one corrected tile group at a time according to a corresponding tile descriptor. Each tile descriptor identifies distorted tile data to retrieve and distorted tile data to skip from the local memory for the corresponding corrected tile group. The tile descriptor includes a descriptor for each row of local memory area identifying data to be read and data to be skipped for each row. Only the data needed for one or more target tiles is read to reduce memory transfer bandwidth overhead.

20 Claims, 6 Drawing Sheets

(56) References Cited

U.S. PATENT DOCUMENTS

| | | | |
|---|---|---|---|
| 2014/0177752 A1 | 6/2014 | Kesling et al. | |
| 2015/0178903 A1* | 6/2015 | Maeno | G06T 5/006 382/275 |
| 2021/0012458 A1* | 1/2021 | Stec | G06T 5/001 |
| 2021/0042890 A1* | 2/2021 | Naidu | G06T 1/60 |

FOREIGN PATENT DOCUMENTS

| | | |
|---|---|---|
| JP | 2001101396 A | 4/2001 |
| JP | 2011142530 A | 7/2011 |

* cited by examiner

| | "000" | SKIP ENTIRE ROW OF BURSTS |
|---|---|---|
| | "001" | SKIP BURSTS UP TO AND INCLUDING COL, READ REMAINING BURSTS IN ROW |
| | "010" | READ BURSTS UP TO AND INCLUDING COL, SKIP REMAINTING BURSTS IN ROW |
| | "011" | READ ALL BURSTS IN ROW |
| | "100" | SKIP BURSTS UP TO COL, READ NUM BURSTS, SKIP REMAINTING BURSTS IN ROW |

# SYSTEM AND METHOD OF USING OPTIMIZED DESCRIPTOR CODING FOR GEOMETRIC CORRECTION TO REDUCE MEMORY TRANSFER BANDWIDTH OVERHEAD

BACKGROUND

Field of the Invention

The present invention relates in general to geometric correction systems, and more particularly to a geometric correction system that reduces bandwidth overhead when reading a distorted image from an input frame to a local memory of geometric correction circuitry.

Description of the Related Art

The problem of geometric distortion is introduced by an optical system of cameras. Geometric distortion is a significant concern for geometric correction systems that may be used in computer vision systems such as, for example, camera-based Advanced Driver-Assistance Systems (ADAS). Geometric distortion causes an object to look different depending on in which area of the camera sensor to which it gets projected. As soon as the distortion exceeds an acceptable value (which depends on the field of view of the camera, the introduced distortion usually gets digitally corrected by a remapping process often implemented in a dedicated hardware block. While the correction could be done as direct remapping by looking for each pixel in the corrected image (target pixel) where it actually comes from (source position) and interpolate the surrounding source pixels accordingly, this is a very inefficient approach that requires reading each source pixel many times massively bloating the bandwidth between the input frame and local memory of the geometric correction hardware.

The process of mapping the pixels of an image from one projection to another projection is done by dedicated hardware in a geometric correction system. One of the methods used to perform remapping is dividing the corrected image into series of grids or tiles. In the hardware, the source data required to generate these tiles is read into the local memory one after another and remapped. In some conventional configurations, the source area data read from the external memory into the local memory of the hardware is often significantly more than necessary to generate a corrected tile. In addition, a significant amount of duplicate data is read from one tile to the next across the entire captured image, so that the transfer of information from the external memory to the internal memory in the conventional configurations is inefficient.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

The inventors have recognized the inefficiency of reading distorted images into geometric correction circuitry in conventional geometric correction systems. They have therefore developed optimized descriptor coding that minimizes the amount of data that is read for each tile from a distorted image in external memory to local memory which substantially reduces tile read overhead of a geometric correction system. The overhead associated with conventional configurations substantially increased data transfer bandwidth and prevented more cost efficient warping solutions. As described herein, the information about which bursts to fetch may be configured offline or during processing as a set of tile descriptors which are used by distortion correction hardware. Embodiments described in the present disclosure provide a way to efficiently code the information of which bursts to read by introducing an encoding scheme using the effect that the sequence of burst which must be read follows a certain pattern. At least one advantage is that the control data that is read for each distortion step is significantly reduced, which in turn reduces the generated external bandwidth.

Figure 1:
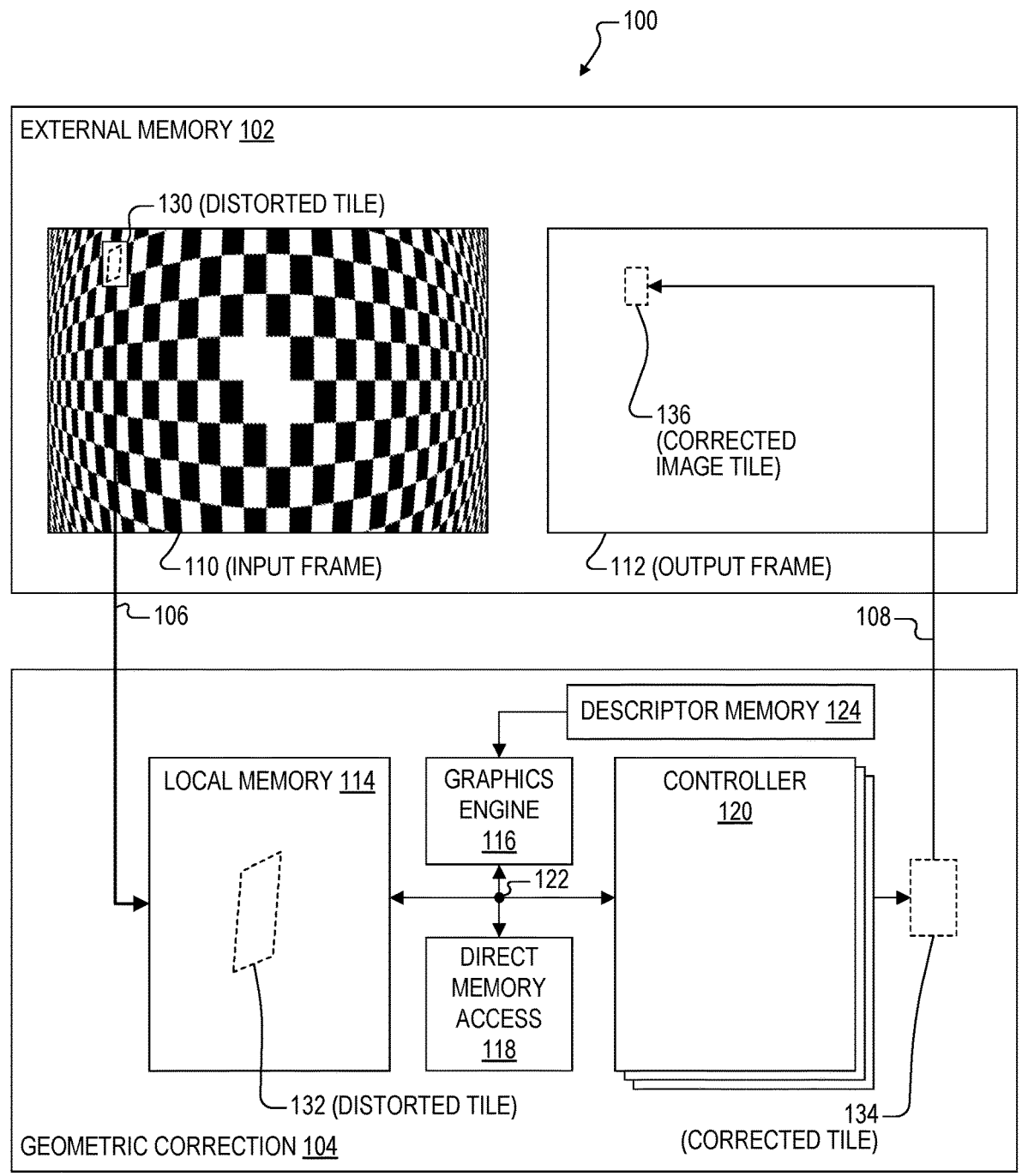
FIG. 1 is a simplified block diagram of a geometric correction system implemented according to one embodiment of the present disclosure.

FIG. 1 is a simplified block diagram of a geometric correction system 100 implemented according to one embodiment of the present disclosure. The geometric correction system 100 may be used in any type of computer vision application, such as, for example, a camera-based Advanced Driver-Assistance Systems (ADAS) or the like. The geometric correction system 100 may be part of a processing system, which may include other suitable components such as additional processing cores, memory, interfaces, and peripherals on the same or different semiconductor substrates. The geometric correction system 100 includes an external memory 102, geometric correction circuitry 104, an input bus 106 and an output bus 108. The external memory 102 may be implemented using any suitable type of memory devices, such as, for example, double data rate (DDR) synchronous dynamic random-access memory (SDRAM). An optical system (not shown) including one or more cameras or camera sensors stores a sensed image in the form of an input frame 110 within the external memory 102. The optical system has a particular field of view and includes physical devices, such as optical lenses or the like, that introduce distortion in the sensed image. As further described herein, the geometric correction system 100 reads distorted source image information from the input frame 110 via the input bus 106, performs geometric correction, and stores corrected image information into an output frame 112 within the external memory 102 via the output bus 108. The input and output buses 106 and 108 may be a single bus or bus system between the external memory 102 and the geometric correction circuitry 104.

In one embodiment, the input and output frames 110 and 112 may each represent video information that is updated on a periodic basis. In a particular embodiment, for example, the input and output frames 110 and 112 may be updated at a rate of 30 frames per second, although any other suitable update rate is contemplated. The input and output frames 110 and 112 may also be represented as an array of pixels, in which each pixel has a selected size. In one embodiment, for example, each pixel may be 2 bytes in which each byte is 8 bits. The external memory 102 storing the frames, however, may store data in groups of bytes referred to as bursts. In one embodiment, each burst is 64 bytes, although other burst sizes are contemplated, such as 8 bytes, 16 bytes, 32 bytes, 128 bytes, etc., depending upon the memory size and type.

The geometric correction circuitry 104 includes a local memory 114, a graphics engine 116, a direct memory access (DMA) circuit 118, a controller 120, an internal bus 122 and descriptor memory 124. The local memory 114, the graphics engine, the DMA 118 and the controller 120 are each coupled together via the internal bus 122. The graphics engine 116, the DMA 118, and the controller 120 may collectively be referred to as a tile reader for reading distorted tiles from the input frame 110 and a tile writer for writing corrected tiles into the output frame 112 of the external memory 102. The descriptor memory 124 stores tile descriptors, further described herein, which are predetermined offline based on known or determined distortion characteristics and an area of the image in the input frame 110 covered by the local memory 114, referred to herein as the local memory area. It is noted that the tile descriptors may initially be stored in the external memory 102 and loaded into the descriptor memory 124 when operation commences.

The controller 120 may be configured to process an image in the input frame 110 tile-by-tile under the control of a graphics engine 116. The controller 120 fetches at least one distorted tile 130 from the input frame 110 into the local memory 114 using DMA 118 according to the addresses provided by the graphics engine 116 for processing to produce corrected image pixels for a corresponding corrected tile 134 in normal raster order. The graphics engine 116 combines local grid information taken from external memory 102 along with a transformation matrix and also along with the tile descriptors in the descriptor memory 124 for each tile of the grid from the image frame 110 which is to be processed by the controller 120 of the geometric correction circuitry 104.

As shown, for example, the distorted tile 130 in the input frame 110 is read into the local memory 114 as a distorted tile 132. The controller 120 includes one or more geometric distortion cores that correct the distorted tile 132 into the corrected tile 134. The controller 120 writes the corrected tile 134 into the output frame 112 as a corrected image tile 136 using DMA 118 according to addresses provided by the graphics engine 116.

Figure 2:
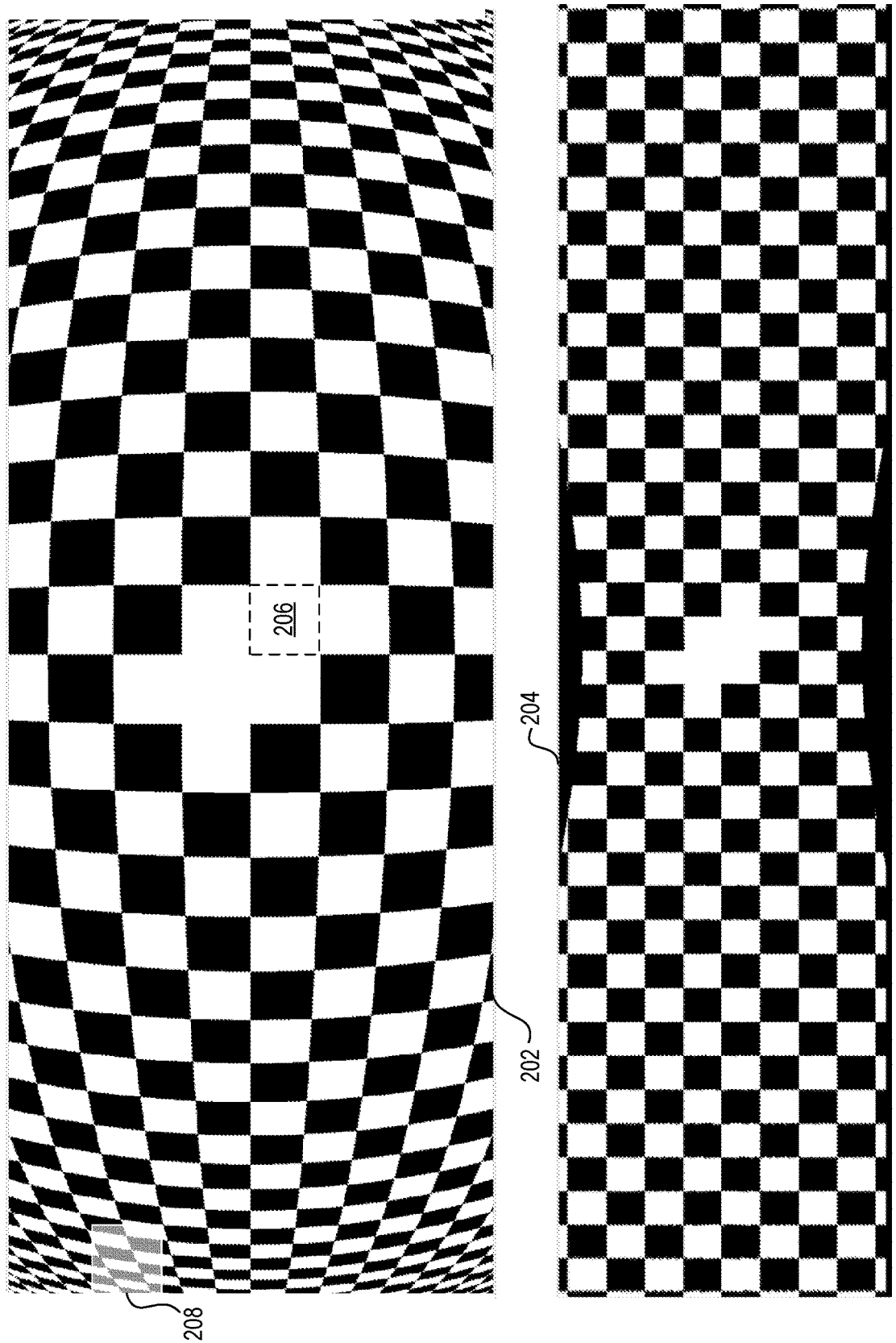
FIG. 2 is a figurative diagram of a distorted frame and a corresponding corrected frame after processing by the geometric correction circuitry of FIG. 1 according to one embodiment of the present disclosure.

FIG. 2 is a figurative diagram of a distorted frame 202 (as an example of the input frame 110) and a corresponding corrected frame 204 (as an example of the output frame 112) after processing by the geometric correction circuitry 104 according to one embodiment of the present disclosure. The corrected frame 204 illustrates a matrix or checker-board image of equal-sized black and white squares. The distorted frame 202 illustrates a distorted image of the same black and white square tiles to more clearly illustrate the effects of distortion across the frame, such as caused by a camera lens or the like. The term "matrix" generally denotes objects (such as tiles, pixels, bursts, etc.) that are organized into rows and columns. The distorted tiles near the left and right sides of the distorted frame 202 are compressed and skewed, but become more expanded and less skewed towards the center of the frame. The geometric correction circuitry 104 removes most or substantially all of the distortion resulting in the "original" or corrected image depicted by the corrected frame 204.

A white distorted tile 206 near the center of the distorted frame 202 is outlined having a size that is expanded in both the horizontal and vertical directions. The distorted tile 206 represents the largest distorted tile within the distorted frame 202. When a tile area 208 having the same size and shape as the distorted tile 206 is superimposed over the smaller tiles at the left side of the distorted frame 202, it is clear that the tile area 208 encompasses multiple smaller distorted tiles in the distorted frame 202 that are intended to be the same size as the distorted tile 206.

The distortion characteristics of each camera system is evaluated and determined and then converted to corresponding mapping information, in which the mapping information is used by the geometric correction circuitry 104 to generate the corrected frame 204 based on the source information of the distorted frame 202 on a tile-by-tile basis. The size of each output or target tile may vary from one configuration to the next. As an example, the target tile size may be 64×64 pixels in a given configuration. The tile area 208 covered by the distorted tile 206 is equal to or greater than the area covered by each of the other distorted tiles in the distorted frame 202, and thus represents the largest distorted tile. When the distortion characteristics are determined for a given camera system, the largest distorted tile of the corresponding distorted frame is identified, such as the distorted tile 206 of the distorted frame 202, and the corresponding tile area 208 is determined. The local memory 114 of the geometric correction circuitry 104 of FIG. 1 is made at least as large as the tile area 208 to at least include all of the distorted source information of the largest distorted tile 206. The corresponding size of the local memory 114 is the local memory area. It is noted that the local memory 114 and the corresponding local memory area may be increased in either or both the horizontal and vertical directions to ensure that it encompasses each and every distorted tile in the distorted frame.

Referring back to FIG. 1, the local memory area representing the corresponding size of the local memory 114 is aligned to encompass a tile group, in which each tile group includes at least one distorted tile in the input frame 110, such as distorted tile 130. A portion of the source information in the input frame 110 is read into the local memory 114, which includes the distorted tile 130 stored as the distorted tile 132 in the local memory 114. The distorted tile 132 is processed by the geometric correction circuitry 104, which converts the distorted tile 132 into the corrected tile 134 and then aligns and stores the corrected tile 134 into the correct position of the output frame 112 as the corrected image tile 136. Since the local memory area of the local memory 114 is sized based on the largest distorted source tile in the input frame 110 (e.g., source tile 206), the size of local memory 114 is significantly larger than most of the distorted tiles in the input frame 110. In conventional configurations, the source area data read from the input frame 110 into the local memory 114 was often significantly more than necessary to generate a corrected output tile. As described further herein, the tile descriptors stored in the descriptor memory 124 substantially reduce the amount of source data read from the input frame 110 to minimize the source data that is retrieved for each source tile.

Figure 3:
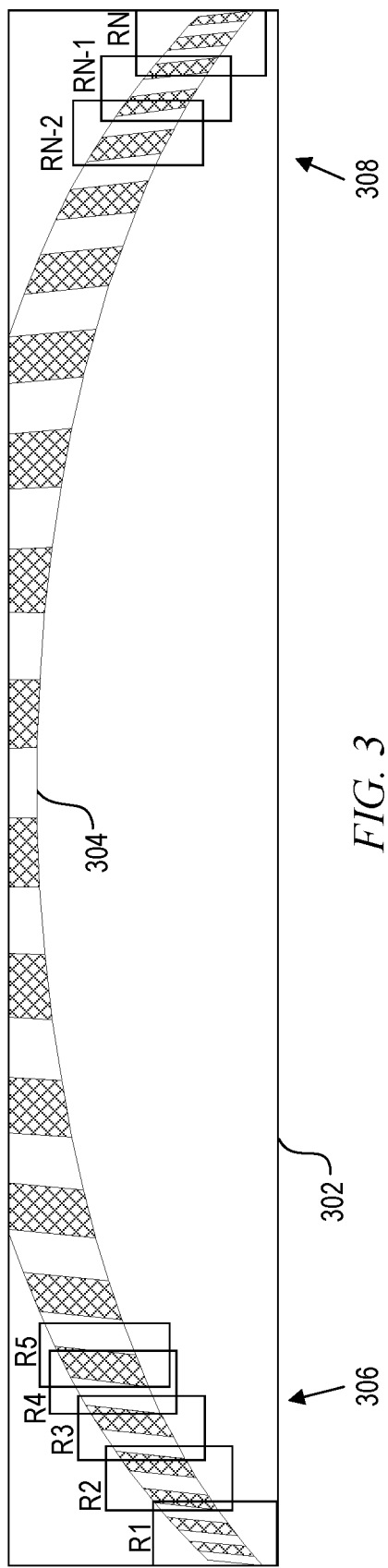
FIG. 3 is a view depicting multiple reads of a top row of distorted tiles of an upper portion of a distorted frame according to one embodiment of the present disclosure.

FIG. 3 is a view depicting multiple local memory area reads R1, R2, R3, R4, R5, . . . , RN-2, RN-1, RN of a top row 304 of distorted tiles of an upper portion of a distorted frame 302 according to one embodiment of the present disclosure. The distorted tiles of the distorted frame 302 are shown alternating between shaded and non-shaded tiles from a left side 306 to a right side 308. Each read R1-RN is depicted as a box illustrating the local area memory size of the local memory 114. Beginning at the left side 306, the first read R1 includes a tile group including the first 4 tiles, the second read R2 includes a tile group including the next 3 tiles, the next read R3 includes a tile group including the following 2 tiles, and the next two reads R4 and R5 each include a tile group of only one tile each in sequential order of the top row 304. This process continues along the top row 304 to the tiles at the end of the top row 304 shown on the right side 308. Although not shown, this process may be repeated in sequential order for each of the remaining rows of the matrix of distorted tiles forming the distorted frame 302. In one embodiment, each local memory area read is aligned by the geometric correction circuitry 104 to include as many of the distorted tiles as possible depending upon the next target tile to be read and the size of the consecutive tiles. In another embodiment, each local memory area read is aligned with the next distorted tile in which the distorted tile is left- or right-shifted as further described herein. In one embodiment, the alignment of the local memory area for each read may be performed by the graphics engine 116.

A first observation is that each read may include a tile group including a different number of complete distorted tiles, as long as each read includes a tile group having at least one complete distorted tile. A second observation is that each read area includes extraneous source information that is outside the target area of interest. The extraneous source information includes information above each of the distorted tiles in the top row 304, and further includes portions of surrounding tiles. For example, the first read R1 includes only a lower portion of the right-most tile within R1, in which the complete right-most tile is read in the second read. Similarly, the second read R2 includes only a portion of the right-most tile within R2, which is entirely included in the third read R3. Given the size of the local memory 114 to include all of the source information to include the largest distorted tile in a given distorted frame, the reads may be aligned to include the source information for at least one tile up to as many distorted tiles as possible.

With reference to FIGS. 1 and 3, the DMA 118 reads the source information from the input frame 110 to include at least one distorted tile and stores the information into the local memory 114, and repeats the process for each of one or more distorted tiles of the input frame 110 until the original image is reconstructed as the corrected image stored in the output frame 112. In a conventional configuration, the source information read from the input frame 110 of the external memory 102 into the local memory 114 included the extraneous information outside the target area of interest, such as information that is ultimately not included in the corrected image and portions of surrounding source tiles that had to be re-read in subsequent source tile reads. The present disclosure describes embodiments in which only the source information needed for each target or corrected tile is read from the input frame 110 to substantially reduce the overhead associated with reading undesired extraneous information, which otherwise tends to increase the overhead of the bandwidth between the external memory 102 and the local memory 114. The geometric correction circuitry 104 includes the descriptor memory 124 including one or more tile descriptors that enable the controller 120 and the graphics engine 116 via the DMA 118 to read substantially less source information to reduce of the overhead of the bandwidth between the external memory 102 and the local memory 114 to thereby improve efficiency.

Figure 4:
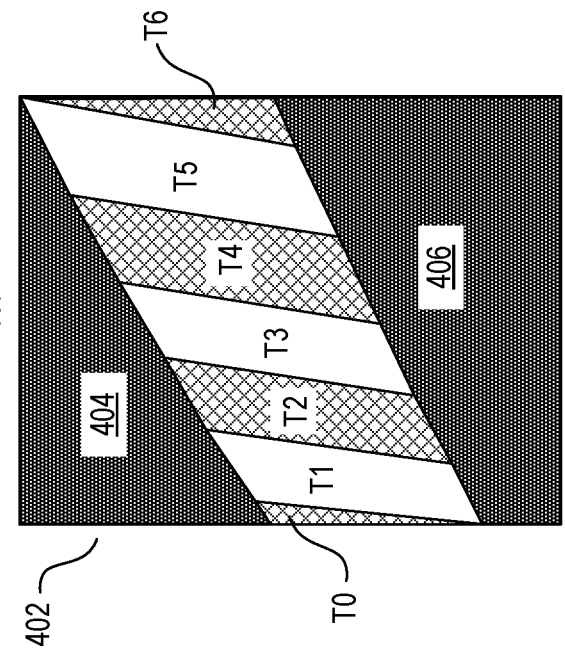
FIG. 4 is an enlarged view of a local memory area of the first read of FIG. 3 further delineating the individual distorted tiles from the distorted frame according to one embodiment of the present disclosure.

FIG. 4 is an enlarged view of a local memory area 402 of the first read R1 of FIG. 3 further delineating a tile group including the individual distorted tiles T1-T5 from the distorted frame 302 according to one embodiment of the present disclosure. In this case, the local memory area 402 is aligned to include a maximum number of distorted tiles from the distorted frame 302 to generate a maximum number of corrected tiles. The odd-numbered distorted tiles T1, T3 and T5 are not shaded whereas the even-numbered distorted tiles T2 and T4 are shaded. An area 404 above the distorted tiles and another area 406 below the distorted tiles within the local memory area 402 incorporates extraneous information that is not needed by the geometric correction circuitry 104 for generating the corresponding 5 corrected tiles to be stored in the corrected output frame 112. Also, a partial distorted tile T0 between the edge of the first distorted tile T1 and the left edge of the local memory area 402 may also be considered as extraneous information, as well a portion of the distorted tile T6 to the right of the fifth distorted tile T5 and the right edge of the local memory area 402. In one embodiment, the tile descriptors in the descriptor memory 124 enable the controller 120 to reject or skip reading the source information contained within the extraneous areas 404 and 406. In the first embodiment, all or a portion of the extraneous distorted tile information T0 and T6 may also be read and not skipped. In a second embodiment, the tile descriptors may be defined to also skip the extraneous distorted tile information T0 and T6.

In the second embodiment, the tile descriptors in the descriptor memory 124 may enable the controller 120 to isolate and include only one distorted tile at a time for each read, such as reading only tile T1 while skipping the remaining information surrounding tile T1. Only distorted tile T2 is read in the next read, only distorted tile T3 in the next and so on.

Figure 5:
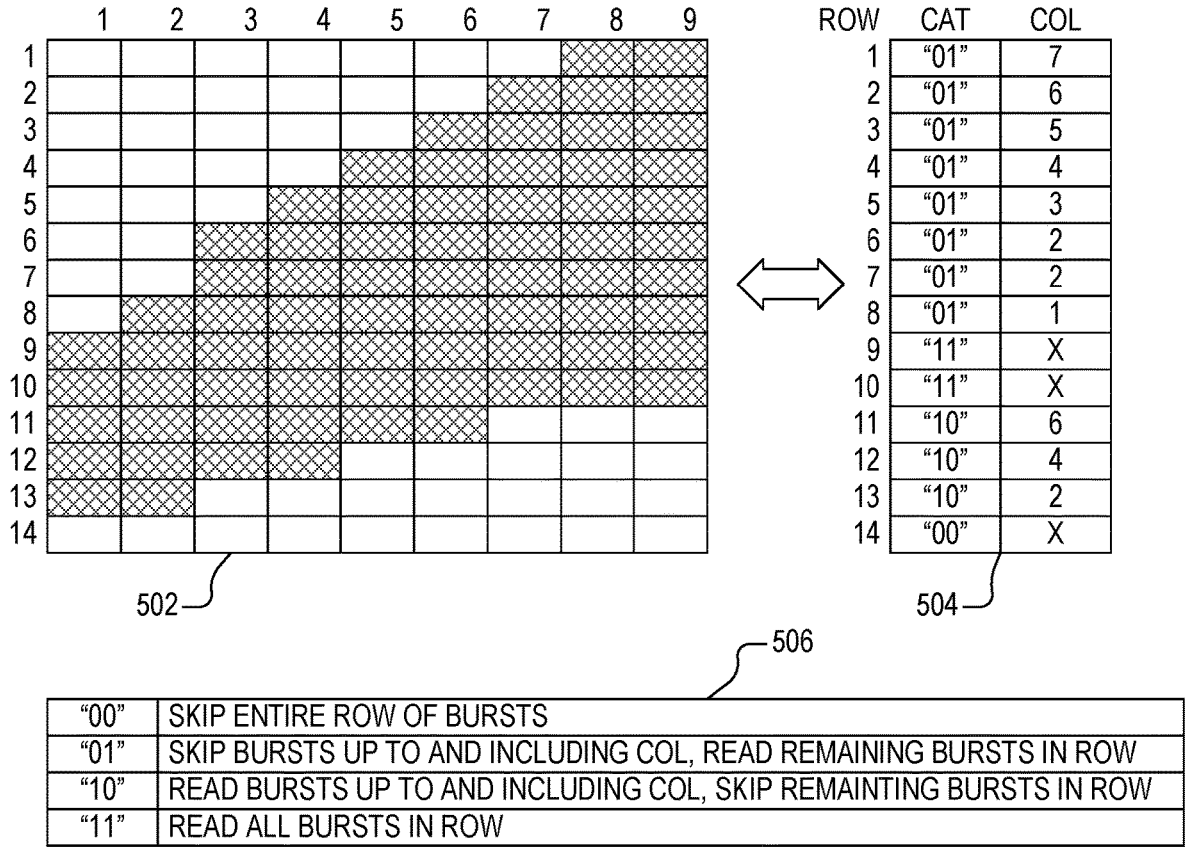
FIG. 5 is a block diagram of an exemplary local memory area of a distorted frame including shaded areas that are included and blank areas (not shaded) that are skipped according to a tile descriptor implemented according to one embodiment of the present disclosure.

FIG. 5 is a block diagram of an exemplary local memory area 502 of a distorted frame including shaded areas that are included and blank areas (not shaded) that are skipped according to a tile descriptor 504 implemented according to one embodiment of the present disclosure. The local memory area 502 is substantially simplified relative to the local memory area 402 described in FIG. 4 for purposes of clearly illustrating operation of the tile descriptor 504. Also, the local memory area 502 is divided into a matrix of bursts according to the configuration of the external memory 102. The external memory 102, for example, may be configured as DDR type memory which are read from and written to in bursts of information for maximum efficiency.

The local memory area 502 includes 14 rows and 9 columns of burst blocks and the tile descriptor 504 is configured as a table including the same number rows as the local memory area 502, which is 14 rows for the illustrated example. The tile descriptor 504 includes 2 columns, including a category value CAT and a column value COL for each row of the local memory area 502. The category value CAT is one of 4 different binary values 00, 01, 10, and 11 described in a corresponding legend 506. The category value 00 means that the entire row of bursts are skipped, while the COL value is undefined (or "X"). The category 01 means that the bursts are skipped up to and including the column identified by the column value COL, while the remaining bursts are included. The category value 10 means that the bursts up to and including the column identified by the column value COL are included, while the remaining bursts are skipped. The category value 11 means that all of the bursts in the row are included so that the COL value is undefined. In this manner, the tile descriptor 504 includes a list of descriptors including one descriptor for each row of the corresponding local memory area 502, in which each descriptor includes a CAT value and a COL value.

For example, the first row 1 of the tile descriptor 504 includes a descriptor with CAT=01 and COL=7, which means that the first 7 bursts of the first row of the local memory area 502 are skipped while the remaining bursts 8 and 9 in the row are read. The descriptors for rows 2-8 are encoded with CAT=01 in similar fashion with a different COL value indicating the number of initial bursts that are skipped with the remaining bursts read for the corresponding rows of the local memory area 502. The descriptors for the ninth and tenth rows are identified with CAT=11, meaning that all of the bursts of rows 9 and 10 of the local memory area 502 are read. The descriptor for the eleventh row is CAT=10 with COL=6 meaning that the first six bursts in row 11 of the local memory area 502 are read while the remaining bursts are skipped. The descriptors for rows 12 and 13 are encoded with CAT=10 in similar fashion as row 11 except with different COL value indicating the number of bursts to read while skipping the rest in each row. The descriptor for the last row 14 is CAT=00 meaning that the entire row of the local memory area 502 is skipped. In this manner, the area including the tile group is included while extraneous source information is skipped.

Referring back to FIG. 4, the descriptor encoding scheme illustrated by the tile descriptor 504, as interpreted by the corresponding legend 506, enables most, if not all, of the extraneous areas 404 and 406 to be skipped, along with at least a portion of the extraneous distorted tile areas T0 and T6, while retaining or including the source information for the distorted tiles T1-T5. The descriptor encoding scheme illustrated by the tile descriptor 504 as shown in FIG. 5, as interpreted by the corresponding legend 506, enables most, if not all, of the extraneous areas in each of the reads R1-RN shown in FIG. 3 to be skipped while including the source information for the target distorted tiles to be read.

The descriptor memory 124 shown in FIG. 1 includes a tile descriptor, similar in format to the tile descriptor 504, for each distorted tile group to be read from the input frame 110 into the local memory 114. Each tile descriptor includes a descriptor for each row of bursts of the input frame 110 in the external memory 102 to be read by the geometric correction circuitry 104 into the local memory 114 for each local memory area read. The alignment of each local memory area read is predetermined offline and controlled during operation by the graphics engine 116. The size of each tile descriptor depends upon the size of the local memory area for each read, which is determined by the size of the local memory 114. The CAT values are only 2 bits each, and the COL value has a size based on the number of columns. It is noted that the columns of the local memory area 502 may actually be numbered 0 to 8 (rather than 1 to 9), in which the maximum COL value is 7, so that only 3 bits are need for the COL value.

Figure 6:
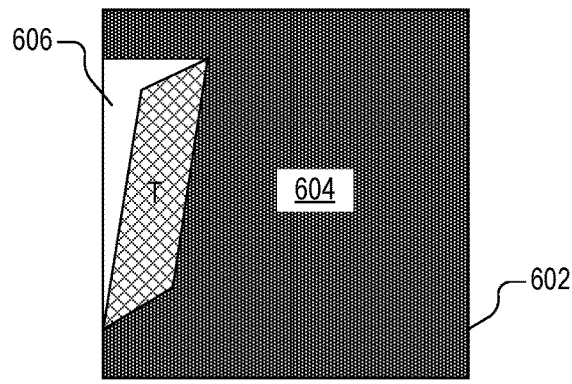
FIG. 6 is a block diagram of an exemplary local memory area of a distorted frame illustrating isolating and reading a single distorted tile according to one embodiment of the present disclosure using the descriptor encoding scheme illustrated by the tile descriptor of FIG. 5.

FIG. 6 is a block diagram of an exemplary local memory area 602 of a distorted frame illustrating isolating and reading a single distorted tile T according to one embodiment of the present disclosure using the descriptor encoding scheme illustrated by the tile descriptor 504. In other words, each tile group to be read includes only 1 distorted tile at a time to generate one corrected tile at a time rather than fitting a maximum number of tiles. In this case, the target tile T is simply aligned to be shifted left-most (or right-most) within each local memory area, with the remaining portion of the local memory area 602 shown as extraneous source information 604. As shown, the local memory area 602 is aligned so that the left-most portion of the distorted tile T is aligned with the left edge of the local memory area 602. In the corresponding tile descriptor, the CAT value 00 is used for each row that does not include any portion of the distorted tile T, and the CAT value 10 is used for each row that does include any portion of the distorted tile T. The reads would include an extraneous source information 606 to the left of the distorted tile T; yet the size of the extraneous source information 604 is substantially larger than the extraneous source information 606 so that the efficiency is still improved by a significant amount. It is noted that the geometric correction circuitry 104 is configured to parse the source information in the local memory 114 corresponding with the distorted tile T from the remaining extraneous source information. In a similar manner, the distorted tile T may be right-most shifted relative to the local memory area 602 with similar result using the CAT value 01.

Figure 7:
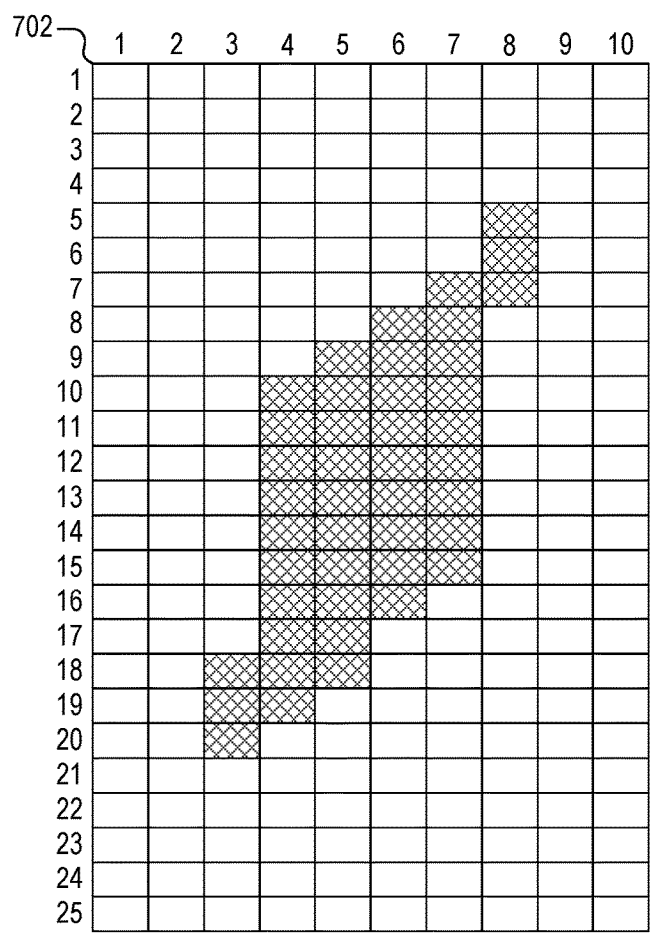
FIG. 7 is a block diagram of an exemplary local memory area of a distorted frame illustrating isolating and reading a single distorted tile using a modified descriptor encoding scheme illustrated by a tile descriptor implemented according to another embodiment of the present disclosure.
Figure 7:
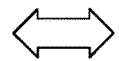

FIG. 7 is a block diagram of an exemplary local memory area 702 of a distorted frame illustrating isolating and reading a single distorted tile T using a modified descriptor encoding scheme illustrated by a tile descriptor 704 implemented according to another embodiment of the present disclosure. In this case the distorted tile T is located within the local memory area 702 but not shifted left-most or right-most so that extraneous source information surrounds the outer edges of the distorted tile T. The corresponding tile descriptor 704 may be a table similar to the tile descriptor 504 including the same number of rows as the number of burst rows of the local memory area 702. Each row of the tile descriptor 704 includes a corresponding descriptor as described by a legend 706, which is similar to the descriptors of the tile descriptor 504 except that each descriptor for each row of the tile descriptor 704 includes a 3-bit CAT value, and a NUM value along with a similar COL value. The CAT value is similar for values 000, 001, 010, and 011 in which the COL value is used in the same manner. However, an additional code 100 is defined. When CAT=100, the bursts are skipped up to the COL value, then a number (NUM) of bursts are read as determined by the NUM value, and then the remaining bursts are skipped. The tile descriptor 704 illustrates increased flexibility for skipping burst information, yet includes one additional bit for encoding CAT and several additional bits for encoding the NUM value.

Figure 8:
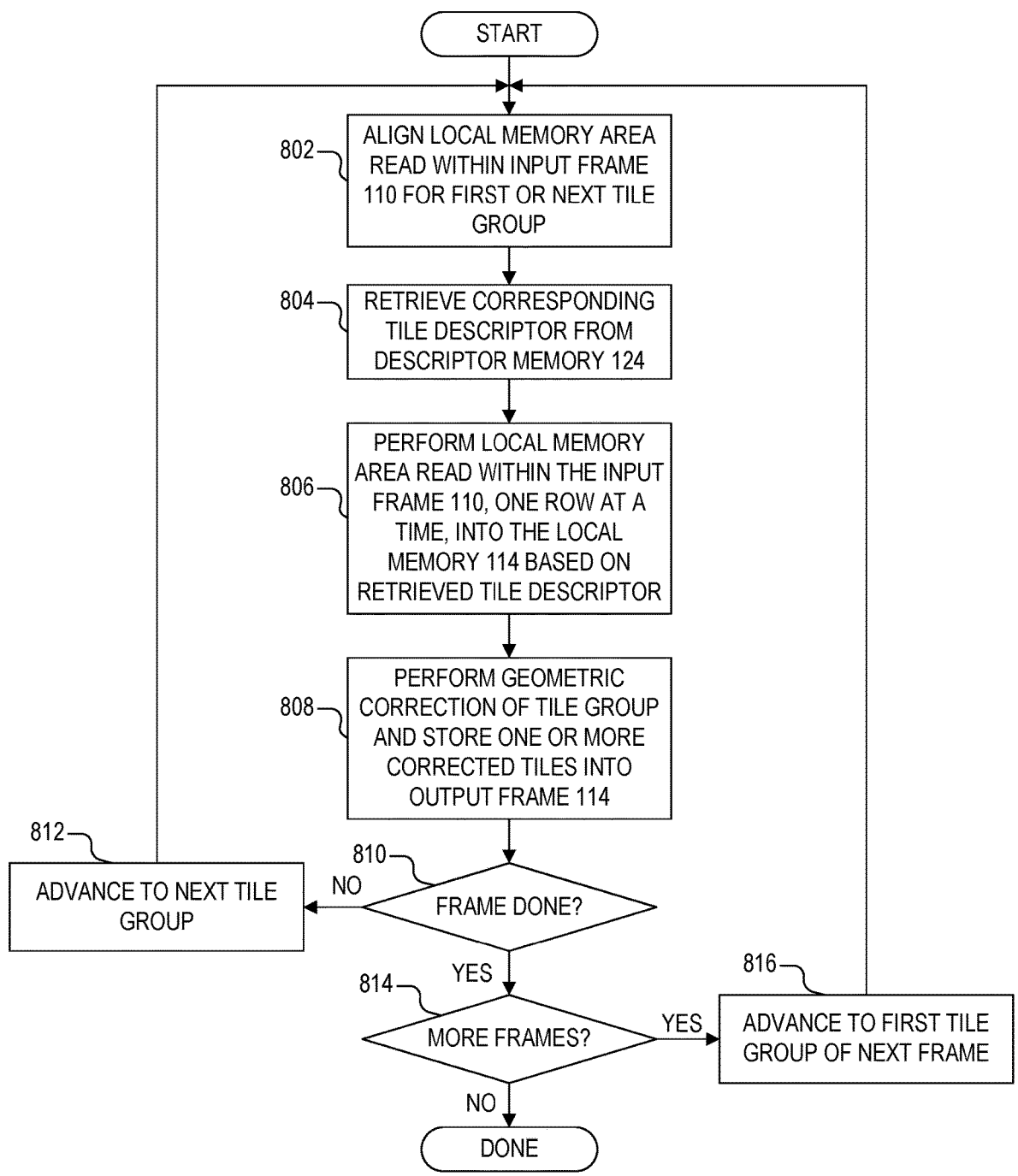
FIG. 8 is a flowchart diagram illustrating operation of the geometric correction circuitry of FIG. 1 according to one embodiment of the present disclosure.

FIG. 8 is a flowchart diagram illustrating operation of the geometric correction circuitry 104 according to one embodiment of the present disclosure. At first block 802, the geometric correction circuitry 104 aligns a local area memory read within the input frame 110 for a first tile group (for first iteration) or a next tile group (during loop). Each local area memory read may be determined by the graphics engine 116 and may also be predetermined by offline evaluations. At next block 804, the graphics engine 116 retrieves the corresponding tile descriptor from the descriptor memory 124. At next block 806, the local memory area read is performed within the input frame 110, one row at a time, into the local memory 114 based on the retrieved tile descriptor. The tile descriptor allows most if not all of the extraneous information in the local memory area read to be skipped. At next block 808, geometric correction is performed on the tile group containing one or more distorted tiles and the corresponding one or more corrected frames are transferred and stored into the output frame 114.

Operation then proceeds to next block 810 in which it is queried whether the current frame is done. If there are more tile groups to be read in the current frame, then operation proceeds to next block 812 in which operation advances to the next tile group in the input frame 110 to be read, and operation loops back to block 802 to align the local memory area read for the next tile group. If instead the current frame is done, then operation advances to block 814 in which it is queried whether there are more frames. Recall that the input and output frames may represent video information that is updated on a periodic basis, such as a certain number of frames per second. If additional frames are to be processed, then operation advances to block 816 in which operation advances to the first tile group to be read in the next frame stored in the input frame 110, and operation loops back to block 802 to align the local memory area read for the next tile group. If instead there are not more frames to process, then operation is completed for the current session.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive logic or negative logic may be used in various embodiments in which the present invention is not limited to specific logic polarities, device types or voltage levels or the like. For example, logic states, such as logic low and logic high may be reversed depending upon whether the pin or signal is implemented in positive or negative logic or the like. In some cases, the logic state may be programmable in which the logic state may be reversed for a given logic function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A processing system that includes a geometric correction system that performs geometric correction of a distorted image in an input frame comprising a matrix of distorted tiles to provide a corrected image in an output frame comprising a matrix of corrected tiles, the geometric correction system comprising:
   a local memory;
   geometric correction circuitry that performs geometric correction on distorted tile data stored in the local memory;
   a tile reader that retrieves distorted tile data from the input frame into the local memory for one corrected tile group at a time according to a corresponding one of a plurality of tile descriptors, wherein each corrected tile group comprises at least one corrected tile; and
   a descriptor memory that stores the plurality of tile descriptors in which each tile descriptor identifies distorted tile data to retrieve from the local memory for a corresponding corrected tile group and identifies distorted tile data not to retrieve for the corresponding corrected tile group.

2. The processing system of claim 1, wherein the local memory has a size sufficient to store a largest distorted tile in the input frame.

3. The processing system of claim 1, wherein the input frame and the output frame are read from or stored into an external memory in bursts.

4. The processing system of claim 1, wherein each corrected tile has a size of 64×64 pixels.

5. The processing system of claim 1, wherein the distorted tile data comprises a matrix of bursts, and wherein each tile descriptor identifies which bursts to read and which bursts to skip from the input frame for a corresponding corrected tile group.

6. The processing system of claim 5, wherein each burst comprises 64 bytes of data.

7. The processing system of claim 5, wherein each tile descriptor comprises a category value and a column identifier for each row of the matrix of bursts which identifies which bursts to read and which bursts to skip.

8. The processing system of claim 5, wherein each tile descriptor comprises a category value and a column identifier for each of a plurality of rows of the matrix of bursts, wherein the category value comprises a first value for skipping an entire row of bursts, a second value for skipping up to a column identified by the column identifier and reading remaining bursts in a row, a third value for reading bursts up to a column identified by the column identifier and skipping remaining bursts in a row, and a fourth value for reading an entire row of bursts.

9. The processing system of claim 5, wherein each descriptor entry comprises a category value, a column identifier and a number value for each of a plurality of rows of the matrix of bursts, wherein the category value comprises a first value for skipping an entire row of bursts, a second value for skipping up to a column identified by the column identifier and reading remaining bursts in a row, a third value for reading bursts up to a column identified by the column identifier and skipping remaining bursts in a row, a fourth value for reading an entire row of bursts, and a fifth value for skipping up to a column identified by the column identifier, then for reading a number of bursts identified by the number value, and then for skipping remaining bursts in the row.

10. A method of retrieving a distorted image from an input frame comprising a matrix of distorted tiles into a local memory for performing geometric correction, the method comprising:
   aligning a local memory area within the input frame to include distorted tile data for generating a corresponding one of a matrix of corrected tile groups wherein each corrected tile group comprises at least one corrected tile; and reading the distorted tile data from the local memory area of the input frame using a corresponding one of a plurality of tile descriptors, wherein each tile descriptor identifies distorted tile data to retrieve from the local memory area and identifies distorted tile data not to retrieve from the local memory area for the corresponding corrected tile group.

11. The method of claim 10, further comprising repeating the aligning and reading for each corrected tile group of the matrix of corrected tile groups.

12. The method of claim 10, further comprising selecting a size of the local memory and corresponding local memory area to store a largest distorted tile of the input frame.

13. The method of claim 10, wherein said aligning comprises aligning the local memory area to include distorted tile data for a maximum number of corrected tiles.

14. The method of claim 10, wherein said aligning comprises aligning the local memory area to include left-most shifted distorted tile data for a target correct tile.

15. The method of claim 10, wherein said aligning comprises aligning the local memory area to include right-most shifted distorted tile data for a target correct tile.

16. The method of claim 10, wherein said reading the distorted tile data comprises reading the distorted tile data in bursts from the local memory area comprising a matrix of bursts, and wherein each tile descriptor identifies which bursts to read and which bursts to skip from the local memory area of the input frame.

17. The method of claim 16, wherein each tile descriptor comprises a category value and a column identifier for each row of the matrix of bursts, and wherein said reading the distorted tile data comprises using a corresponding category value and a corresponding column identifier for determining which bursts to read and which bursts to skip for each corresponding row of the matrix of bursts.

18. The method of claim 16, wherein each tile descriptor comprises a category value, a column identifier, and a number value for each row of the matrix of bursts, and wherein said reading the distorted tile data comprises using a corresponding category value, a corresponding column identifier, and a corresponding number value for determining which bursts to read and which bursts to skip for each corresponding row of the matrix of bursts.

19. The method of claim 16, wherein each tile descriptor comprises a category value and a column identifier for each of a plurality of rows of the matrix of bursts, wherein said reading the distorted tile data comprises skipping an entire row of bursts when the category value comprises a first value, wherein said reading the distorted tile data comprises skipping up to a column identified by the column identifier and reading remaining bursts in a row when the category value comprises a second value, wherein said reading the distorted tile data comprises reading bursts up to a column identified by the column identifier and skipping remaining bursts in a row when the category value comprises a third value, and wherein said reading the distorted tile data comprises reading an entire row of bursts when the category value comprises a fourth value.

20. The method of claim 16, wherein each tile descriptor comprises a category value, a column identifier, and a number value for each of a plurality of rows of the matrix of bursts, wherein said reading the distorted tile data comprises skipping an entire row of bursts when the category value comprises a first value, wherein said reading the distorted tile data comprises skipping up to a column identified by the column identifier and reading remaining bursts in a row when the category value comprises a second value, wherein said reading the distorted tile data comprises reading bursts up to a column identified by the column identifier and skipping remaining bursts in a row when the category value comprises a third value, wherein said reading the distorted tile data comprises reading an entire row of bursts when the category value comprises a fourth value, and wherein said reading the distorted tile data comprises skipping up to a column identified by the column identifier, then for reading a number of bursts identified by the number value, and then for skipping remaining bursts in the row when the category value comprises a fifth value.

* * * * *